United States Patent [19]

Pfeil

[11] 4,280,797

[45] Jul. 28, 1981

[54] METHOD OF CONTROLLING THE SUPERCHARGE PRESSURE IN AN INTERNAL-COMBUSTION ENGINE, AND EXHAUST-GAS TURBOSUPERCHARGER FOR PERFORMING THE METHOD

[75] Inventor: Horst Pfeil, Darmstadt, Fed. Rep. of Germany

[73] Assignee: Aktiengesellschaft Kühnle, Kopp & Kausch, Frankenthal, Fed. Rep. of Germany

[21] Appl. No.: 915,133

[22] Filed: Jun. 13, 1978

[30] Foreign Application Priority Data

Jun. 22, 1977 [DE] Fed. Rep. of Germany ....... 2728024

[51] Int. Cl.$^3$ ................. F04B 35/00; F04B 29/44; F04B 29/30
[52] U.S. Cl. ........................... 417/406; 415/205; 415/210; 415/212 R; 416/188
[58] Field of Search ............. 415/205, 210, 212 R, 415/213 B; 416/183, 185, 188; 417/406, 407; 60/605

[56] References Cited

U.S. PATENT DOCUMENTS 2,933,884 4/1960 Foster .......................... 60/39.15 X

*Primary Examiner*—Leonard E. Smith
*Attorney, Agent, or Firm*—Herbert L. Lerner

[57] ABSTRACT

Method of increasing supercharge pressure at low full-load speed of an engine and for simultaneously limiting the supercharge pressure to a given value at high full-load speed of the engine, includes passing a flow of exhaust gas through a bladed rotor of an exhaust-gas turbine inwardly from the outside through respective entrances and exits of the rotor blades which, in the region of the entrances thereof, are disposed in a plane wherein the axis of the turbine is also disposed, so that a difference in a respective circumferential component of the velocity of the exhaust-gas flow between the blade entrance and the blade exit, taken with respect to the circumferential component of the exhaust-gas flow velocity at the blade entrance, is at least as great at low speeds of the engine as at higher speeds thereof.

2 Claims, 14 Drawing Figures

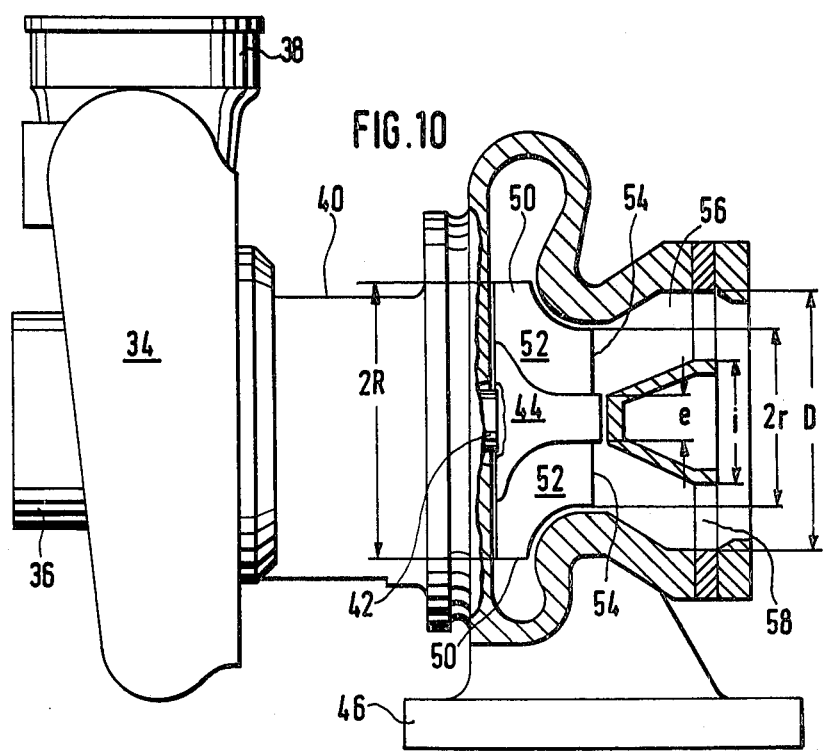
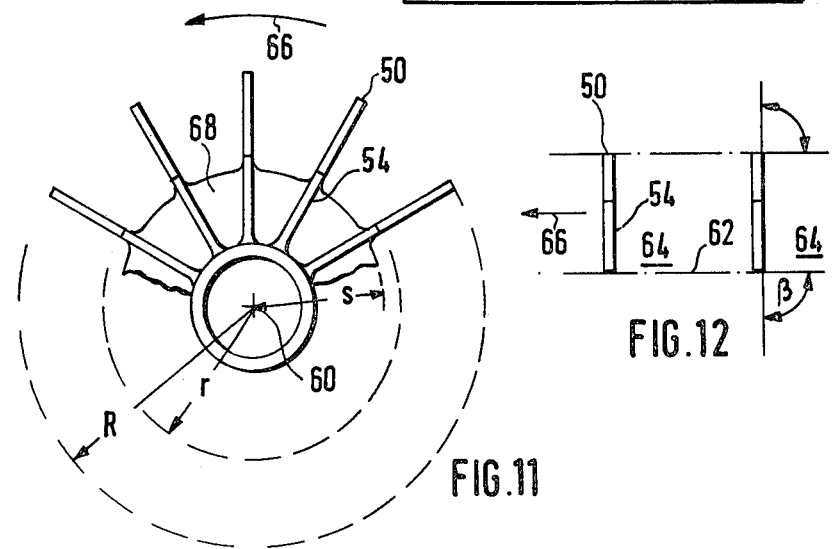

METHOD OF CONTROLLING THE SUPERCHARGE PRESSURE IN AN INTERNAL-COMBUSTION ENGINE, AND EXHAUST-GAS TURBOSUPERCHARGER FOR PERFORMING THE METHOD

The invention relates to a method of controlling or increasing the supercharge pressure by an exhaust-gas turbosupercharger at low full-load speed of an engine and, simultaneously, for limiting the supercharge pressure to a given value at high full-load speed of the engine. The invention also relates to an exhaust-gas turbosupercharger for performing the foregoing method, which includes an exhaust-gas turbine, the rotor of which is traversed by a flow of exhaust gas inwardly from the outside and the blades of which are disposed, at the region of the blade entrance, virtually in a plane wherein the axis of the turbine is also disposed.

The exhaust-gas turbine of an exhaust-gas turbosupercharger has the function of converting the pressure energy (static energy) contained in the exhaust gas of the engine, the velocity energy (kinetic energy) and heat (thermal energy) as much as possible into torque at the turbine shaft, in order to compress the supercharge air of the engine by means of a radial-compressor wheel disposed on the same shaft. With heretofore known methods for supercharging internal-combustion engines and with heretofore known exhaust-gas turbosuperchargers, the interaction or cooperation of the exhaust-gas turbine with the compressor often results in unfavorable operating behavior of the internal-combustion engine. This undesirable operating behavior is that insufficient charging of the engine is achieved at low engine speeds, and too much charging at high engine speeds. As a result, a lower power output is available in the range of low engine speeds than would be required for acceleration. At high speeds, on the other hand, the output of the engine is increased too much, and this can lead to harmful peak pressures in the engine.

In the heretofore known methods of this general type, the exhaust turbosupercharger is constructed to accomodate the supercharge pressure, so that it delivers a relatively high supercharge pressure even in the lower engine-speed range. To prevent high peak pressures in the upper engine-speed range, part of the exhaust gas coming from the engine is blown off, bypassing the exhaust-gas turbine. The most varied dispositions of relief valves have become known heretofore for this purpose, such as are disclosed, for example, in German Patents DT-PS No. 1 203 537 and 1 238 722; German Published Non-Prosecuted Application DT-OS 2 613 398 as well as the German Petty Patent GT-Gm No. 1 989 619.

The heretofore known methods for attaining an optimal supercharge pressure curve (volume flow of the charging air as a function of the pressure) are unsatisfactory, since the expense for auxiliary equipment (such as relief valves, for example) does not meet the demand for simplicity of construction, reliability and economical cost of the exhaust-gas turbosupercharger. In fact, however, it is the operating reliability of relief valves, which contain mechanically moving parts, that is not always sufficiently assured. Residues, such as oil carbon, in the exhaust gas can block the valve. Also, corrosion of the valve can lead to malfunctioning and therefore, to clogging of the valve. Failure of the relief valve then causes heavy damage to the engine and to the exhaust-gas turbosupercharger.

It is accordingly an object of the invention to provide a method of increasing or controlling the supercharge pressure at low full-load speed of an engine and for simultaneously limiting the supercharge pressure to a given value at high full-load speed of the engine, as well as to provide an exhaust-gas turbosupercharger for carrying out this method, wherein the supercharge pressure curve is optimized inasmuch as the supercharge pressure at low engine speeds is already higher than in heretofore known supercharge methods and exhaust-gas turbosupercharger, whereas, at high engine speeds, the pressure of the supercharge air supplied by the exhaust-gas turbosupercharger is not supposed to exceed a limit which is dangerous to the engine. This object of the invention is accomplished without any additional devices at the exhaust-gas turbosupercharger i.e. exclusively by measures at the exhaust-gas turbosupercharger per se.

With the foregoing and other objects in view, there is provided, in accordance with the invention, a method of increasing supercharge pressure at low full-load speed of an engine and for simultaneously limiting the supercharge pressure to a given value at high full-load speed of the engine, which comprises passing a flow of exhaust gas through a bladed rotor of an exhaust gas turbine inwardly from the outside through respective entrances and exits of the rotor blades which, in the region of the entrances thereof, are disposed in a plane wherein the axis of the turbine is also disposed, so that a difference in a respective circumferential component of the velocity of the exhaust-gas flow between the blade entrance and the blade exit, taken with respect to the circumferential component of the exhaust-gas flow velocity at the blade entrance, is at least as great at low speeds of the engine as at higher speeds thereof.

In heretofore known methods of controlling the supercharge pressure i.e. for obtaining a supercharge pressure curve which is optimal in the aforedescribed sense, the difference of the circumferential component of the flow velocity between the blade entrance and the blade exit, referred to the circumferential component of the flow velocity at the blade entrance, is smaller at lower speeds than at higher speeds. Since this quotient is a measure for the energy conversion of the exhaust-gas turbine, the energy conversion is smaller in heretofore known methods at lower rotor speeds than at higher rotor speeds, which results in the hereafore-described undesirable operating situation. If, on the other hand, the method according to the invention is applied, a somewhat better energy conversion is surprisingly obtained in the lower speed range and, at higher speeds, a limitation of the energy conversion is obtained, which can be adjusted so that a given limit value of the supercharge pressure is not exceeded.

In accordance with another feature of the method invention, the passing of the exhaust-gas flow through the bladed rotor is such that a difference in a respective angular momentum of the exhaust-gas flow between the blade entrance and the blade exit, taken with respect to the angular momentum of the exhaust-gas flow at the blade entrance, is at least as great at low speeds of the engine as (and advantageously greater than) at higher speeds thereof.

In accordance with the apparatus of the invention, there is provided an exhaust-gas turbosupercharger for performing the method of increasing supercharge pressure according to the invention, comprising an exhaust-gas turbine having a bladed rotor and means for passing a flow of exhaust gas inwardly from the outside through respective entrances and exits of the rotor blades, the blades, in the region of the entrances thereof, being disposed in a plane wherein the axis of the turbine is also disposed, each of the blades, respectively, enclosing with a radial plane of the blade, in a region of the exit of the blade, an exit angle of at least 90° (as measured on the pressure side of said blade).

The inventive construction of the blades in the region of the blade exit accomplishes the objective without having to use additional or auxiliary devices, and exclusively by measures which influence or affect the flow.

Heretofore known radial-turbine wheels have blades which, in the region of the blade entrance, are disposed substantially in a plane in which the turbine axis is disposed. Towards the blade exit, these blades are curved against the flow direction ("backwards") i.e. the exit angles (as measured at the pressure side of the blades) are smaller than 90°. Such a turbine rotor is shown in the block "Aufladung von Verbrennungsmotoren" (Supercharging of Internal-Combustion Engines) by Zinner, Springer Verlag 1975, shown as a drawing on page 82, in FIG. 6.9, and in the same book as a photograph on page 217, in FIG. 10.1. These heretofore known turbines have the highest possible energy conversion at all engine speeds.

According to the invention, on the other hand, the blades of the exhaust-gas turbine are bent "forward" in the region of the blade exit i.e. bent in direction of flow, so that these blades include with the radial plane of the blades, in the region of the blade exit, an exit angle of at least 90° (as measured at the pressure side of the blades).

Tests on an exhaust turbosupercharger constructed in accordance with the invention have led to the surprising result, which contradicts the prevailing opinion, that such a turbine wheel with "forward"-curved blades can deliver a sufficiently high and even higher supercharge pressure at low engine speeds but delivers at high engine speeds only a limited supercharge pressure which makes the use of auxiliary devices such as relief valves unnecessary. All theory and practice heretofore excludes turbine blades which are curved forward at the blade exit, since heretofore known exhaust-gas turbines are constructed so as to achieve optimal energy conversion as far as possible over the entire operating range thereof. This requirement or demand for optimal energy conversion, however, is desirable only to the extent that a highest possible supercharge pressure is desirable, such as, for example, when accelerating the engine under load from a low speed.

Optimal conversion of the exhaust gas energy is undesirable, however, if it results in an excessively high supercharge pressure, for example, at full load and high engine speed. In heretofore known constructions, part of the exhaust gas is then blown off through a previously mentioned relief valve prior to entering the exhaust-gas turbine. In the heretofore known exhaust-gas turbosuperchargers, this exhaust-gas turbine then contains only a reduced quantity of exhaust gas, yet converts the energy content thereof optimally into supercharge pressure in accordance with known design principles. Contrary thereto, all the exhaust gas flows through the exhaust-gas turbosupercharger according to the invention, but the degree of energy conversion (not the efficiency) in the turbine decreases to the extent that the amount of the available energy increases. The excess exhaust gas is discharged from the exhaust-gas turbine with the excess, unspent or non-consumed energy and is thus so-to-speak "blown off" through the exhaust-gas turbine. Special relief valves or other auxiliary devices are not required, since the exhaust-gas turbine per se assumes the function of a relief valve. It should be noted particularly that the internal turbine efficiency is not affected by the degree (inventively reduced) of the energy conversion.

If the exit angle is 90°, in accordance with an added feature of the invention, the blades then have approximately planar surfaces over the entire extent thereof, which means that not only the region of the blade entrance but also the region of the blade exit is disposed substantially in the axial plane in which the axis of the turbine is disposed. This is the case of the pure or true "star wheel".

In accordance with an additional feature of the invention, the blades are curved forwardly, and the exit angle is from 90° to 140°.

In accordance with yet another feature of the invention, the blades have an entrance diameter and an exit diameter, and the radio of the exit diameter to the entrance diameter of the blades is between 0.5 and 0.75.

In accordance with yet a further feature of the invention, wherein the turbine rotor is a wheel having a rear wall, and the rotor blades have an entrance diameter, to reduce the rotating masses; the rear wall has a diameter smaller than the entrance diameter of the rotor blades, especially in the case of the pure or true star wheel.

In the exhaust-gas turbosupercharger according to the invention, the exhaust gas is emitted with high kinetic energy since, especially in high speed ranges, the exhaust-gas energy in the exhaust-gas turbosupercharger is not completely converted. To utilize this exhaust energy which is not converted in the exhaust-gas turbosupercharger, in accordance with yet an added feature of the invention, an annular-channel diffuser is disposed or connected downstream from the turbine rotor in flow direction of the exhaust gas. This produces a further increased improvement in the engine operation by the therebyy achieved increase of the flushing or rinsing pressure gradient or drop. As is well known, flushing or rinsing of the engine cylinder is improved if a greatest possible underpressure is generated behind the outlet valve in the exhaust line after the outlet valve has been opened and the exhaust pressure waste has passed off. Through the annular-channel diffuser according to the invention, a large part of the exhaust-gas energy that has not been converted in the exhaust-gas turbine is converted into static pressure. Since the diffuser works against the ambient atmosphere, this results in a reduction of the pressure level at which the turbine wheel operates. Consequently, the pressure level in the exhaust line forward of the exhaust-gas turbine also drops and the flushing or rinsing pressure gradient or drop is increased.

Conventionally, the exit cross section of the diffuser is larger than the exit cross section of the blades. In accordance with another feature of the invention, moreover, the diffuser has an exit with an inner diameter larger than the inner diameter of the rotor blading at the exit of the blades thereof, in order to reduce the rotational component and the losses.

In accordance with a further feature of the invention, the diffuser has an exit, and a flow guidance device is disposed at the diffuser exit in order to permit the exhaust-gas flow to discharge parallel to the turbine axis and without angular momentum.

In accordance with an added feature of the invention, the flow guidance device is a guide vane ring.

Especially in conjunction with the annular-channel diffuser, the turbine rotor according to the invention not only affords the aforementioned advantages for the operation of the engine but, in the special case of the radial star wheel, can also be produced especially economically. In accordance with a concomitant feature of the invention, the exhaust-gas turbosupercharger has various components thereof under stress, at least part of the stressed components being formed of ceramic material. Other features which are considered as characteristic for the invention are set forth in the appended claims.

Although the invention is illustrated and described herein as embodied in method of controlling the supercharge pressure in an internal-combustion engine, and exhaust-gas turbosupercharger for performing the method, it is nevertheless not intended to be limited to the details shown, since various modifications may be made therein without departing from the spirit of the invention and within the scope and range of equivalents of the claims.

The invention, however, together with additional objects and advantages thereof will be best understood from the following description when read in connection with the accompanying drawings, in which:

FIG. 10 is an axial view partly in section of an exhaust-gas turbosupercharger, the partly sectional view thereof in the region of the turbine wheel according to the invention;

FIG. 11 is a fragmentary diagrammatic view of a turbine wheel according to the invention, constructed as a star wheel, the view being from the exit end of the turbine wheel;

FIG. 12 is a fragmentary view of a developed projection of the turbine wheel of FIG. 11 onto the circumferential plane thereof;

Figure 1:
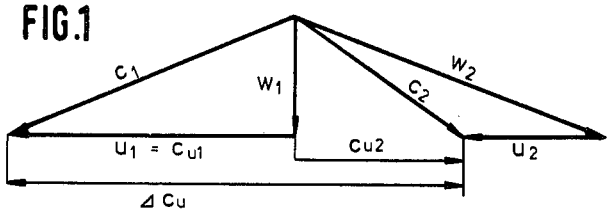
FIGS. 1 and 2 are diagrams depicting velocity triangles at low and high turbine speed for a backwardly curved blade of the turbine rotor.

Referring now to the drawing and first, particularly, to FIGS. 1 to 8 thereof, there are indicated in the various illustrated velocity triangles the following variables which may have any arbitrary units:

$c_1$ = absolute velocity at the blade entrance
$c_2$ = absolute velocity at the blade exit
$u_1$ = circumferential velocity at the blade entrance
$u_2$ = circumferential velocity at the blade exit
$w_1$ = relative velocity at the blade entrance
$w_2$ = relative velocity at the blade exit
$c_u$ = circumferential component at the blade entrance
$c_{u2}$ = circumferential component at the blade exit.

Furthermore, in the hereinafter following explanations of FIGS. 1 to 8, the following variables likewise in arbitrary units or, insofar as the quotients are concerned, in dimensionless numbers, are of significance:

$(c_{u1} - c_{u2})/c_{u1} = Q_c$, or the difference of the circumferential component of the flow velocity between the blade entrance and the blade exit, with respect to the circumferential component of the flow velocity at the blade entrance, 2r is the entrance diameter of the blade, 2r is the exit diameter of the blade, $(c_{u1}R - c_{u2}r)/c_{u1}R = Q_d$, or the difference of the angular momentum of the flow between the blade entrance and the blade exit, with respect to the angular momentum of the flow at the blade entrance.

Figure 2:
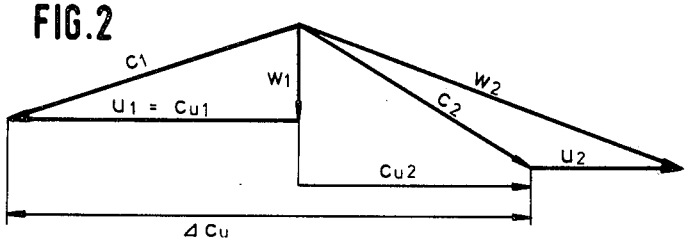

If $c_{u1}$ and $c_{u2}$ have different directions and therefore, different signs, FIGS. 1 and 2 show velocity triangles at respectively low and high speed of an exhaust-gas turbine, the turbine rotor of which has conventional backwardly curved blades. In the case of the low turbine speed (FIG. 1), a quotient $Q_c = 1.6$ is obtained.

Figure 3:
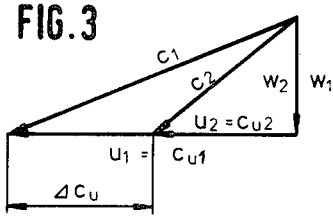
FIGS. 3 and 4 are diagrams depicting velocity triangles at low and high turbine speed for flat or planar blade (a star wheel)
Figure 4:
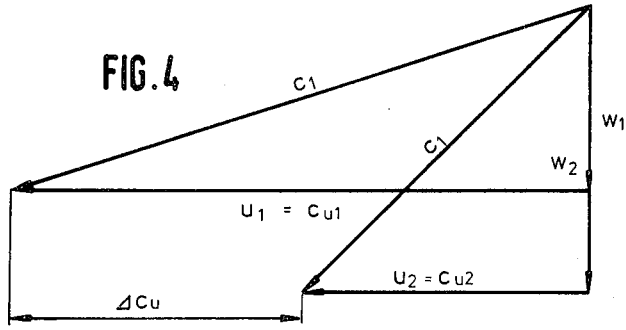

From FIG. 2, a quotient $Q_c = 1.8$ for the high turbine speed is obtained. This quotient $Q_c$ at low rotor speed is therefore smaller than at the higher rotor speed, so that a necessary condition of the method invention of the instant application, namely that the difference of the circumferential component of the flow velocity between the blade entrance and the blade exit with respect to the circumferential component of the flow velocity at the blade entrance be at least as large at low speeds of the turbine rotor as at the high speeds thereof, is not met. FIGS. 3 and 4 show the velocity triangle in a turbine rotor according to the invention which is constructed as a true star wheel as shown in FIGS. 11 and 12. The velocity triangle of FIG. 3 applies to low rotary speed, and the velocity triangle according to FIG. 4 to a high rotary speed.

In the case of FIGS. 3 and 4, a quotient $Q_c = 0.5$ is obtained for a low turbine speed, and the same quotient $Q_c = 0.5$ for the high turbine speed. In the case of the true star wheel, therefore, the method of the invention is already assured, namely that the difference of the circumferential component of the flow velocity between the blade entrance and the blade outlet, with respect to the dircumferential component at the blade entrance, is of the same magnitude at low rotary speeds as at high rotary speeds.

Figure 5:
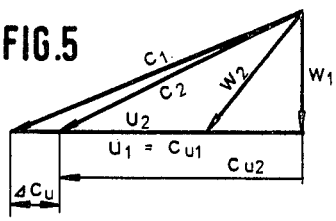
FIGS. 5 to 8 are diagrams depicting velocity triangles at low and high turbine speeds for forwardly curved blades.
Figure 6:
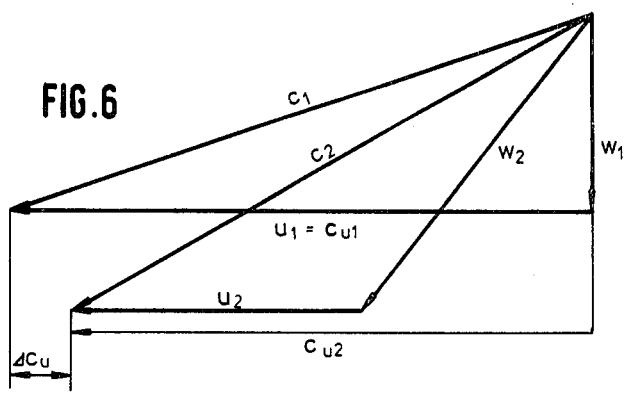

FIGS. 5 and 6 show velocity triangles for a forwardly curved blade. From FIG. 5, a quotient $Q_c = 0.17$ is obtained for a low turbine speed, and from FIG. 6, for a high turbine speed, a quotient $Q_c = 0.1$. This forwardly curved blade therefore fulfills hereinaforementioned condition of the method of the invention.

Figure 7:
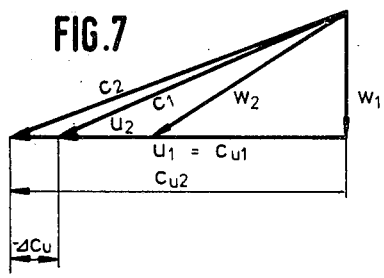
Figure 8:
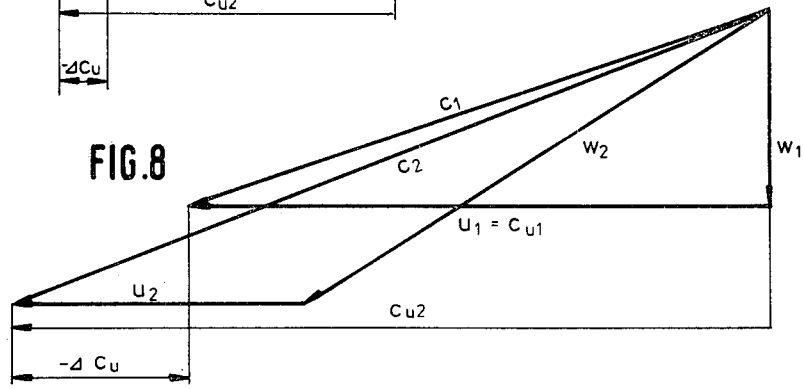

FIGS. 7 and 8 show velocity triangles for a blade with sharply forward curvature; from FIG. 7, which applies for a low turbine speed, a quotient $Q_c = 0.17$ is obtained, while from FIG. 8, applicable for a high turbine speed, a quotient $Q_c = 0.31$ is obtained. Taking the negative signs into consideration, according to the method of the invention, the quotient $Q_c$ is larger, for the low turbine speed than for the high turbine speed.

FIGS. 1 to 8 show that the method according to the invention can be implemented by a star wheel, a turbine rotor having forwardly curved blades and, finally, by a turbine rotor having sharply forwardly curved blades. Assuming, for example, that the entrance diameter 2R of the blades has the value 2 and the exit diameter 2r of the blades has the value 1, then the following values are obtained for the quotient $Q_d$ from the velocity diagrams of FIGS. 1 to 8, further in accordance with another mode of the method of the invention, which calls for the difference of the angular momentum of the flow between the blade entrance and exit, with respect to the angular momentum of the flow at the blade entrance, to be at least as large at low rotary speeds as at higher rotary speeds:

From FIG. 1: $Q_d=0.88$;   from FIG. 5: $Q_d=0.58$;
From FIG. 2: $Q_d=1.4$;    from FIG. 6: $Q_d=0.55$;
From FIG. 3: $Q_d=0.75$;   from FIG. 7: $Q_d=0.42$;
From FIG. 4: $Q_d=0.75$;   from FIG. 8: $Q_d=0.34$.

By a comparison of these numerical values it is found that only the velocity diagrams of FIGS. 1 and 2 are at variance with this other mode of the method invention which requires that the difference of the angular momentum of the flow between the blade entrance and exit, with respect to the angular momentum of the flow at the blade entrance, is at least as large at low rotary speeds as at higher rotary speeds, the quotients obtained from the velocity diagrams in the remaining FIGS. 3 to 8 are in agreement with this other mode of the method of the invention.

Figure 9:
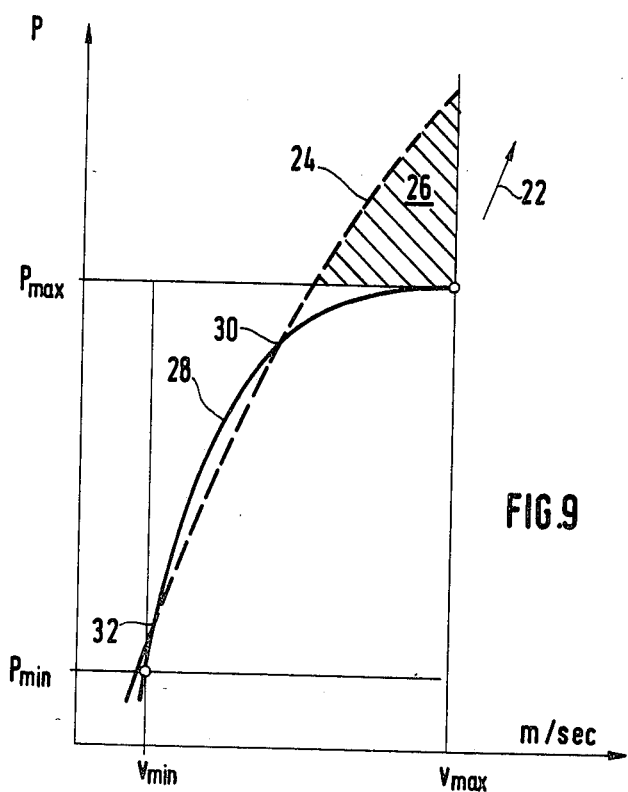
FIg 9 is a plot diagram of pressure to flow velocity showing two supercharge-pressure curves.

FIG. 9 shows the supercharge pressure P as a function of the volume flow V of the compressor in m³/sec. The broken-line curve 24 shows the course of supercharge pressure at full load which is self-adjusting as a function of the engine speed and the engine output in heretofore known exhaust-gas turbosuperchargers. This curve 24 defines a hatched region 26 in which the pressure exceeds the ermissible maximum value $P_{max}$ and is produced at full load and high engine speed. With conventional methods of exhaust-gas turbosuperchargers for supercharging the supercharging air, this harmful region 26 is avoided by relief valves and the like.

The solid-line curve 28 shows the course of the supercharge pressure according to the method of the invention and accordingly the exhaust-gas turbosupercharger according to the invention, at full load. Curves 24 and 28 mutually intersect at an upper intersection point 30 and at a lower intersection point 32, as shown in FIG. 9. In the medium load range between these two intersections 30 and 32, an even higher, and therefore more favourable, supercharge pressure is attained by the application of the method according to the invention and the exhaust-gas turbosupercharger according to the invention than according to the conventional curve 24. In the range of high engine speeds above the upper intersection point 30, the supercharge pressure remains lower, however, without any region 26 of excessive pressure being reached.

The exhaust-gas turbosupercharger shown in FIG. 10 has a compressor 34 which sucks in the supercharge air through an intake or suction nozzle or connecting piece 36 and discharges it through an outlet connecting piece 38. A turbine shaft 42 carrying a turbine rotor 33 is supported in a bearing housing 40.

Exhaust gas enters through an inlet connecting piece 46, arrives at a blade entrance 50 of blades 52, flows through these blades inwardly from the outside, leaves these blades at a blade exit 54 and arrives in a ring channel diffuser 56. This ring channel diffuser 56 flares outwardly in accordance with the invention i.e.

(a) the exit diameter D of the ring channel diffuser 56 is greater than the greatest exit diameter 2r at the blade exit, and (b) the inner diameter i at the exit of the diffuser 56 is greater than the inner diameter e at the exit of the blades 52.

Through this diameter increase, a large portion of the exhaust gas energy that has not been converted in the exhaust gas turbine is converted into static pressure. Since the diffuser works against the outer atmosphere, this results in a reduction of the pressure level at which the turbine rotor 44 operates. In this regard, the pressure level in the exhaust line forward of the exhaust gas turbine also drops, and the rinsing pressure head is increased.

After passing through the ring channel diffuser 56, the exhaust gas flows through a guide vane ring 58 wherein the exhaust-gas flow is aligned in parallel with the axis, so that it can leave without any angular momentum imparted thereto.

The simplest embodiment of a turbine rotor 44 according to the invention, namely as a pure star wheel, is shown in FIG. 11 wherein the star wheel is seen from the exhaust-gas exit end thereof. It is apparent that the blades of this star wheel of FIG. 11 are disposed in the region of the blade entrance 50 as well as in the region of the blade exit 54, in an axial plane wherein the axis 60 of the turbine is disposed. The blade surfaces are of fully planar construction over the entire extent thereof. In this simplest embodiment of a turbine wheel according to the invention, equal quotients $Q_c$ and $Q_d$ are obtained in accordance with the hereinaforementioned equations, as was explained hereinbefore with respect to FIGS. 3 and 4.

FIG. 12 shows a portion of a developed projection of the turbine wheel of FIG. 11 onto the circumferential plane thereof. The completely flat or planar construction of the turbine blades is readily apparent. In the region of the blade exit 54, these blades include an exit angle $\beta$ of 90° with the radial plane 62 (i.e. the plane normal to the axis 60 or the plane of the drawing of FIG. 11). The angle $\beta$ is measured on the pressure side 64 of the blades i.e. on the side of these blades facing away from the exhaust-gas flow direction as represented by the arrow 66.

Completely planar construction of the blades thereof, the turbine rotor 11 is especially well suited for being made of ceramic material.

According to FIG. 11, the ratio of the largest exit diameter 2r of the blade exit 54 to the diameter 2R of the blade entrance 50 is 0.63. This value is within the limits of another feature of the invention, namely that the aforementioned ratio be between 0.5 and 0.75.

It is further seen in FIG. 11 that the rear wall 68 of the turbine wheel extends only in the region of the blade exits 54 in the interest of economizing or saving material; the diameter 2s of the rear wall 68 of the turbine wheel is thus smaller than the diameter 2R of the blade entrance 50 and even slightly smaller than the greatest diameter 2r of the blade exit 54.

Figures 13, 14:
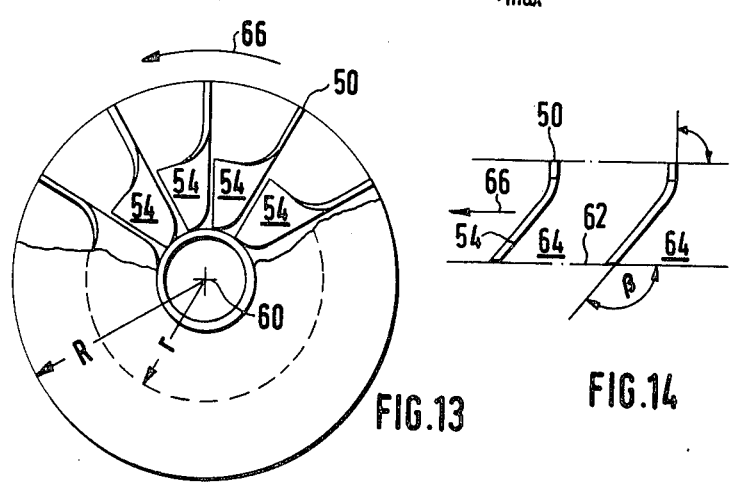
FIG. 13 is a view similar to that of FIG. 11 of another embodiment of the turbine wheel according to the invention with forwardly curved rotor blades also as viewed from the exit end of the turbine wheel.
FIG. 14 is a fragmentary view of a developed projection of the turbine wheel according to FIG. 13 onto the circumferential plane thereof.

FIG. 13 shows, as seen from the exit side thereof, a turbine rotor according to the invention having blades 52 that are forwardly curved in the region of the blade exit 54 i.e. in flow direction (direction of rotation represented by the arrow 66). The entrance part 50 of the blades again extends in the axial plane which passes through the axis 60 of the turbine. Just as in FIG. 12, the entrance part 50 of the blades in FIG. 13 is thus disposed perpendicularly to the radial plane 62. Contrary to FIG. 12, however, the angle $\beta$ according to FIG. 14 is equal to 130° and therefore falls within a required range for the invention, namely from 90° to 140°. This construction of the blades results in quotients $Q_c$ and $Q_d$ meeting the requirements of the method of the invention as described hereinbefore for specific numerical values with respect to FIGS. 3 to 8.

The ratio of the greatest exit diameter 2r to the entrance diameter 2R according to FIG. 13 is 0.63 and therefore lies within the required limits according to the invention of the aforementioned range of such ratios from 0.5 to 0.75.

What is claimed:

1. Exhaust-gas turbosupercharger for limiting supercharge pressure comprising an exhaust-gas turbine having a bladed rotor, a compressor operatively connected to said bladed rotor, and means for passing a flow of exhaust gas inwardly in substantially radial direction from the outside through respective entrances and exits of the rotor blades, said blades, respectively, being disposed at least partly, in longitudinal planes and, at a region of said exits of said blades, intersecting with a plane radial to said blades at an exit angle of at least 90° as measured on the pressure side of said blades, said blades having an entrance diameter and an exit diameter, and the ratio of the exit diameter to the entrance diameter of said blades is between 0.5 and 0.75.

2. Exhaust-gas turbosupercharger for limiting supercharge pressure comprising an exhaust-gas turbine having a bladed rotor, a compressor operatively connected to said bladed rotor, and means for passing a flow of exhaust gas inwardly in substantially radial direction from the outside through respective entrances and exits of the rotor blades, said blades, respectively, being disposed at least partly, in longitudinal planes and, at a region of said exits of said blades, intersecting with a plane radial to said blades at an exit angle of at least 90° as measured on the pressure side of said blades, said turbine rotor being a wheel having a rear wall, and said rotor blades having an entrance diameter, said rear wall having a diameter smaller than the entrance diameter of said rotor blades.

* * * * *